United States Patent [19]
Kutz

[11] 3,820,820
[45] June 28, 1974

[54] PEDAL DRIVE
[76] Inventor: John E. Kutz, 960 S. Pierce St., Lakewood, Colo. 80226
[22] Filed: Apr. 3, 1972
[21] Appl. No.: 240,548

[52] U.S. Cl.................. 280/252, 280/253, 280/261
[51] Int. Cl............................................. B62m 1/00
[58] Field of Search .......... 280/252, 253, 256, 257, 280/261, 248

[56] References Cited
UNITED STATES PATENTS

| | | | |
|---|---|---|---|
| 559,299 | 4/1896 | Matthern | 280/261 |
| 651,316 | 6/1900 | Smith | 280/252 |
| 1,535,714 | 4/1925 | Burke | 280/261 |

FOREIGN PATENTS OR APPLICATIONS

| | | | |
|---|---|---|---|
| 17,686 | 1893 | Great Britain | 280/261 |
| 15,032 | 1893 | Great Britain | 280/252 |
| 875,366 | 8/1961 | Great Britain | 280/252 |
| 3,288 | 1910 | Great Britain | 280/252 |
| 13,030 | 1901 | Great Britain | 280/252 |
| 802,435 | 6/1936 | France | 280/252 |

*Primary Examiner*—Leo Friaglia
*Assistant Examiner*—Jack D. Rubenstein
*Attorney, Agent, or Firm*—Horace B. Van Valkenburgh

[57] ABSTRACT

A pedal drive for a bicycle or the like having each pedal mounted upon an individual chain which defines a pedal path selected to produce a more effective thrust during a major portion of the downward movement of each pedal. The pedal chains, a matched pair, move along upright, generally oblong paths between upper and lower sprockets. The corresponding sprockets for each pair of chains are carried upon common shafts, while the pedals are attached to the chains to move in opposition. Each pedal cantilevers from its chain, and to prevent tipping movement at the chain, articulated stabilizer arms are pivotally secured to the frame and pivotally connect with the pedals. This pedal drive is connected to the rear wheel of the bicycle by various sprocket and chain arrangements.

7 Claims, 17 Drawing Figures

PEDAL DRIVE

This invention relates to pedal drives used on bicycles and other pedal driven vehicles and mechanisms, such as pedal driven boats, catamarans and the like. Accordingly, the invention will be called a "pedal drive," and described in conjunction with its use on a bicycle.

The primary object of the invention is to provide a novel and improved pedal drive which provides greater pedaling effectiveness for propelling a vehicle, such as a bicycle.

Another object of the invention is to provide a novel and improved pedal drive wherein an extended downward driving stroke of each pedal is along a vertical path, to produce a maximum sustained driving thrust throughout substantially the entire driving stroke of the pedal, from the uppermost to the lowermost position of the pedal.

Another object of the invention is to provide a novel and improved pedal drive, as in a bicycle, wherein the paths of the pedal strokes conform to a substantial extent to the natural movement of a cyclist's legs to better utilize his strength and endurance.

Another object of the invention is to provide a novel and improved pedal drive which minimizes the extent of the ineffective pedal movement during each complete cycle of pedaling, such as occurs in conventional bicycle drives when a pedal is at the top and also at the bottom of its power stroke and the cyclist cannot effectively apply any driving force to the pedal.

Another object of the invention is to provide a novel and improved pedal drive, especially for a bicycle, which can be proportioned to permit long power strokes with each pedal and with a minimum of ineffective pedal movement at top and bottom positions of the pedal, to thus assist a cyclist in sustained pedaling, as on an uphill grade.

Other objects of the invention are to provide a novel and improved pedal drive which is a simple, neat appearing, economical, easily repaired, rugged and durable unit.

With the foregoing and other objects in view, all of which more fully hereinafter appear, my invention comprises certain constructions, combinations and arrangements of parts and elements, as hereinafter described and illustrated in preferred embodiment in the accompanying drawings, in which:

Figure 1:
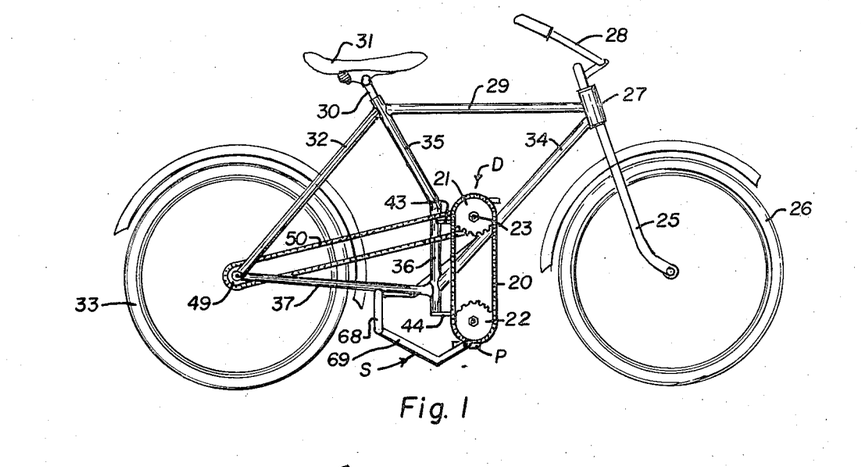
FIG. 1 is a side elevation of a bicycle which includes a preferred embodiment of the improved pedal drive.
Figure 2:
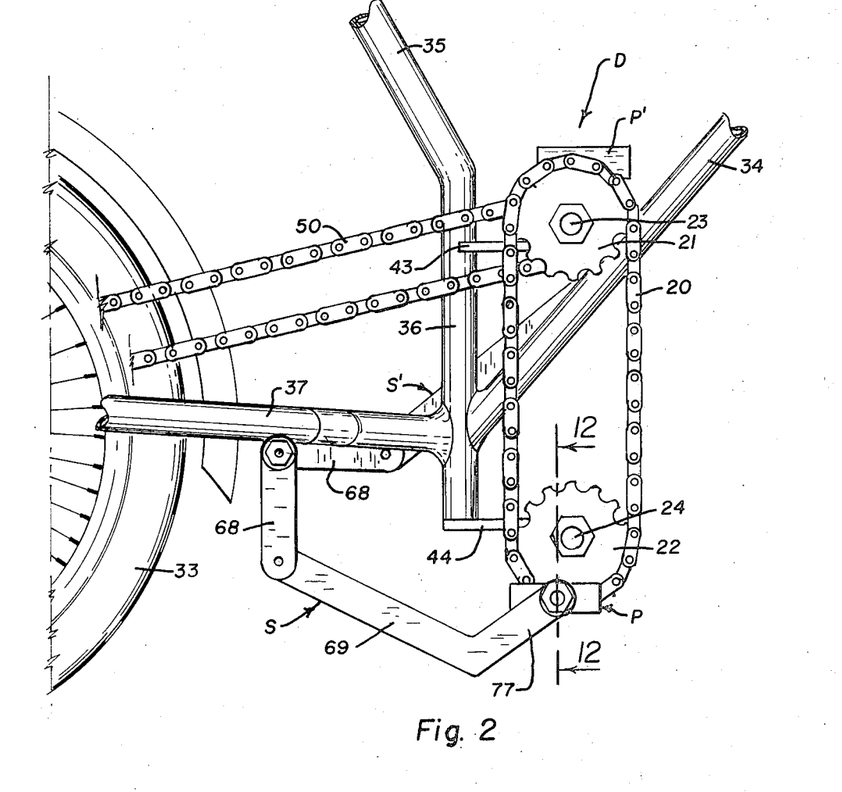
FIG. 2 is a fragmentary side elevation of a portion of FIG. 1, but on an enlarged scale to better show the pedal drive of this invention.
Figure 3:
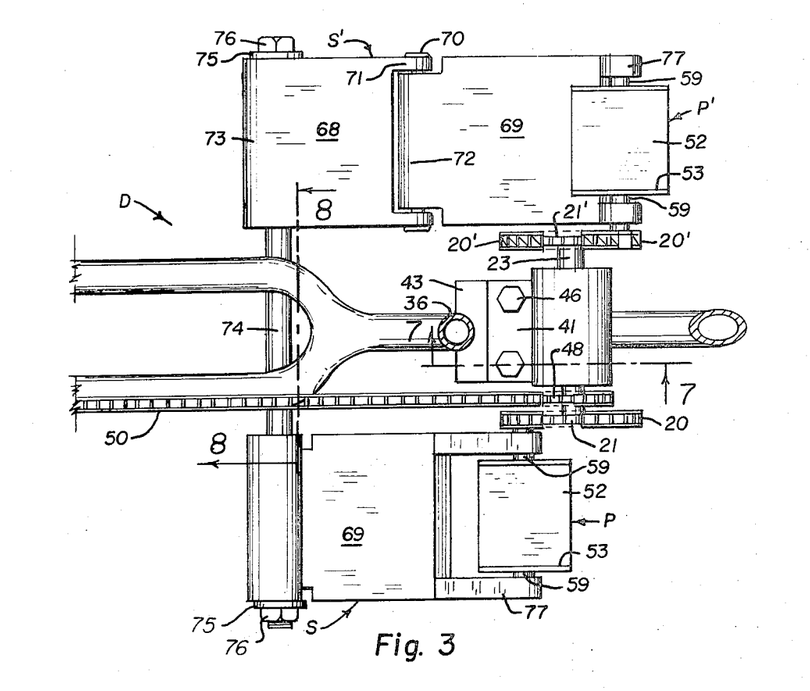
FIG. 3 is a top plan view of the organization shown in FIG. 2.

Referring to FIGS. 1–3 of the drawings, a conventional bicycle is slightly modified, as explained later, to include an improved pedal drive D of this invention. A pedal P, at the right side of the bicycle, and a pedal P', at the left side, are mounted upon chains 20 and 20', respectively to cantilever outwardly therefrom. Each chain is fitted between an upper sprocket 21 and 21', respectively, and a lower sprocket 22 and 22', respectively, to provide oblong, vertical pedal paths. The pedals which cantilever from their chains are maintained in an outstanding position by stabilizer arms S and s', as will be described.

The two upper sprockets 21 and 21' are mounted upon a common shaft 23, while the two lower sprockets 22 and 22' are mounted upon a common shaft 24. These shafts are, in turn, mounted in bearings carried in the bicycle frame and are operatively connected with the rear bicycle wheel, all as hereinafter described.

Figure 6:
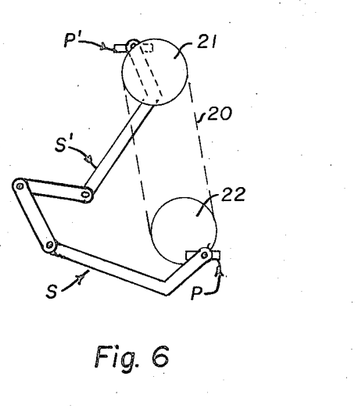
FIG. 6 is a diagrammatic view similar to FIG. 4, but showing the pedal drive as inclined rearwardly, as at about 10° from the vertical.

The sprockets 21 and 21' are of the same size, and the sprockets 22 and 22' are of the same size, as shown. Accordingly, these chains move in unison about their sprockets, with the pedals P and P' being in diametric opposition at all times. The chains 20 and 20' define oblong pedal paths, which are preferably vertical, but which may be inclined from the vertical a few degrees, as indicated in FIG. 6.

Figure 4:
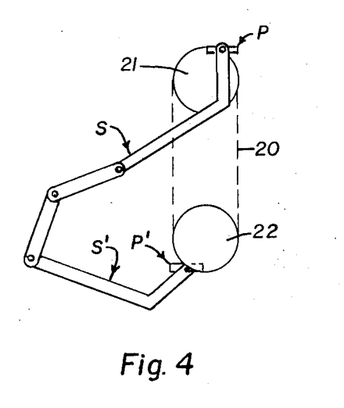
FIG. 4 is a small scale, diagrammatic side elevation of the pedal drive per se, illustrating the right pedal near the top of its path and about to commence a downward power stroke and the left pedal positioned near the bottom of its path and about to commence a return stroke.
Figure 5:
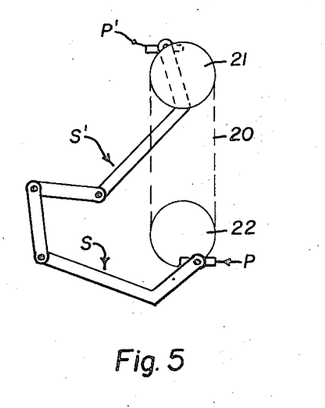
FIG. 5 is a diagrammatic view similar to FIG. 4, but showing the right pedal as having substantially completed its power stroke and the left pedal as having substantially completed a return stroke before moving over the top of the path.

As illustrated in FIGS. 4 and 5, when the right pedal P is at the upper position of FIG. 4, substantially all of its movement will be downward and along a straight line, to the lower position of FIG. 5. Similarly, when the left pedal P' moves between corresponding positions, substantially all of its movement will be downward and essentially along a straight line. Thus, the driving stroke of each pedal will be essentially along a downward path and in a direction more nearly compatible with the natural leg movements of the cyclist and more effective than the circular movement of a conventional bicycle pedal. Moreover, the ineffective portion of pedal movement, when the pedals move horizontally at the top and at the bottom of the strokes, is minimized. Of course, when pedal P is moving between the lower position of FIG. 5 up to the upper position of FIG. 4, the thrust on the opposite pedal P' will be necessary to move pedal P, as in a conventional bicycle. However, the greater effectiveness of the downward stroke of pedal P' will be positively moving pedal P, during such movement.

This invention does not require a major alteration of a conventional bicycle. The bicycle frame of FIG. 1 includes a conventional fork 25 in which a front wheel 26 is mounted. A housing 27 holds the fork shaft, and handlebars 28 are connected thereto, while a top bar 29 extends rearwardly to the position of a seat post 30 on which a seat 31 is mounted. Spaced struts 32 extend rearwardly and downwardly therefrom, while a rear wheel 33 is mounted between these struts. The above parts are conventional and only the lower portion of the frame is modified, but in minor detail, although an angular front brace bar 34 may be essentially unchanged. Thus, a central brace bar 35, which holds the seat post, is angular to provide a lower vertical portion 36 for attachment of the pedal drive components. Conventional rearwardly extending lower forked struts 37 connect with struts 32 and embrace the rear wheel 33. Such changes in proportion as are made are to provide for locating and mounting the pedal drive D upon the frame at a suitable position, such that a person sitting on the bicycle seat 31 can easily and comfortably reach and move the pedals P and P'.

Figures 7, 8:
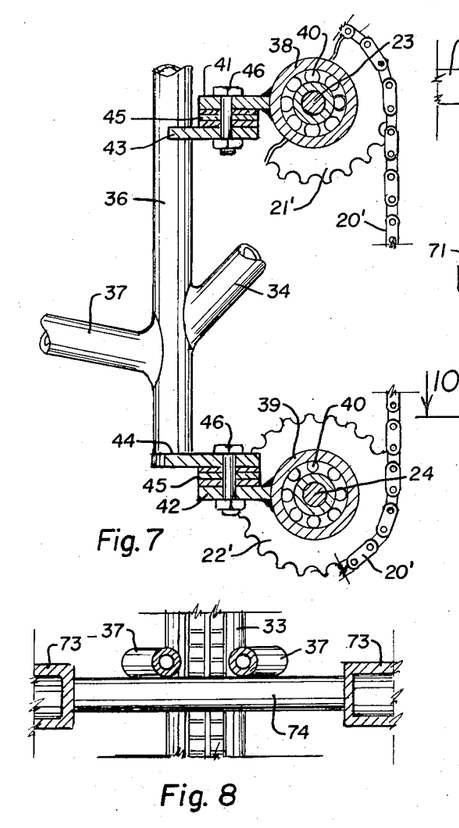
FIG. 7 is a fragmentary, longitudinal sectional detail, taken along line 7—7 of FIG. 3 and showing one manner in which the improved pedal drive may be adjustably mounted upon the bicycle.
FIG. 8 s a fragmentary, transverse sectional detail, taken along 8—8 of FIG. 3 and showing one manner in which the pedal stabilizing arms may be attached to the frame of the bicycle.

As best shown in FIGS. 3 and 7, the upper shaft 23 and the lower shaft 24 are carried in bearing housings 38 and 39, respectively, which are adjustably fitted onto the vertical portion 36 of the central brace bar 35, as will be described. Each bearing housing is a short, cylindrical tube having snuggly fitting therewithin a pair of conventional ball bearings 40 and associated races, which, in turn, carry the respective shafts 23 and 24 for rotation. The end of each shaft 23 and 24 projects from each end of each housing 38 and 39, so that the sprockets 21 and 21' may be mounted on shaft 23, and sprockets 22 and 22' may be mounted on shaft 24, as hereinbefore described. Preferably, the housings 38 and 39 are equipped with conventional dust shields (not shown) where the shafts project therefrom.

Each housing 38 and 39 is adjustably mounted upon the vertical section 36 of the central frame bar. For this purpose, a flat plate 41 outstands rearwardly from the upper bearing housing 38, and a similar plate 42 outstands rearwardly from the lower bearing housing 39, the plates being connected to the respective housings, as by welding. An upper frame lug 43 and a lower frame lug 44 are attached, as by welding, to the vertical portion 36 of the bicycle frame, to outstand forwardly at a spacing which approximates the spacing of the upper and lower bearing housings 38 and 39 when positioned apart to tension the chains 20 and 20' on the respective sprockets. The bearing housing plates 41 and 42 may lap above or below the frame lugs 43 and 44 in any suitable manner, being separated by shims 45 of appropriate thickness to hold the bearing housings at a proper spacing, to maintain the chains 20 and 20' taut.

Plates 41 and 42 are attached to the respective lugs by bolts 46, as best illustrated in FIG. 7. Preferably, several shims 45, as shown are used for each bearing housing 38 and 39, to permit upward or downward adjustment of the bearing housings 38 and 39, in order to adjust the tension of chains 20 and 20'. It may also be desirable to provide for horizontal adjustment of either or both housings, such as for the purpose of inclining the upper shaft 23 relative to lower shaft 24, as in the manner indicated in FIG. 6 and hereinbefore mentioned. This may be done in any conventional manner, not shown, such, for example, as by extending the length of one or more of lower plate 42 and lug 44, in any manner desired.

The mechanical connection between the pedal drive D and the bicycle rear wheel is, to a substantial extent, a conventional arrangement, in that chains and sprockets are the preferred components for such connections. Thus, a drive sprocket 48 is mounted on the upper shaft 23 adjacent the upper bearing housing 38, as shown in FIG. 3. Sprocket 48 is in planar alignment with a conventional driven sprocket 49 on the hub of the rear wheel 33, while a chain 50 extends between the pair of sprockets 48 and 49 to rotate the rear wheel of the bicycle in a conventional manner.

The pedals P and P' are operated by the weight and leg push of the cyclist moving them on each power stroke. Each pedal P and P', as in FIGS. 2 and 3, is essentially conventional, having a rectangular rubber foot block 52 secured between side plates 53, although a pair of foot blocks may be mounted on pins extending between the side plates, in a conventional manner. In addition, a central transverse passageway in block 52, as in FIG. 12, extends between the side plates 53 and is reinforced by, and defined by, a rigid tube 54 enlarged at each end 55 to provide an outer race for ball bearings 56 which engage inner bearing races 57.

Figures 11, 12, 13:
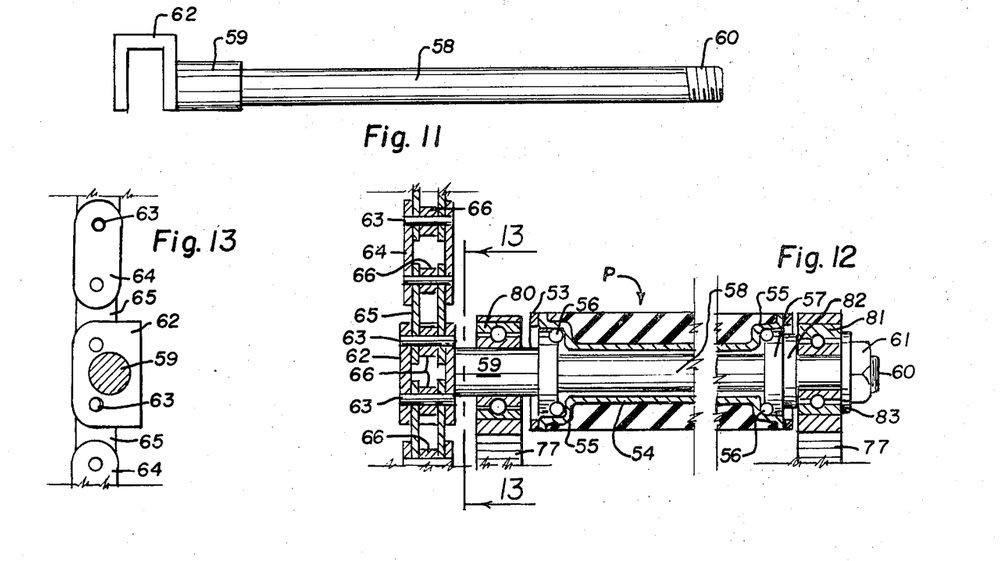
FIG. 11 is a side view of a pedal shaft per se.
FIG. 12 is a condensed sectional detail through the pedal, as taken along line 12—12 of FIG. 2 but on an enlarged scale and showing a portion of the chain which carries the pedal in section.
FIG. 13 is a fragmentary sectional detail taken along line 13—13 of FIG. 12.
Figure 14:
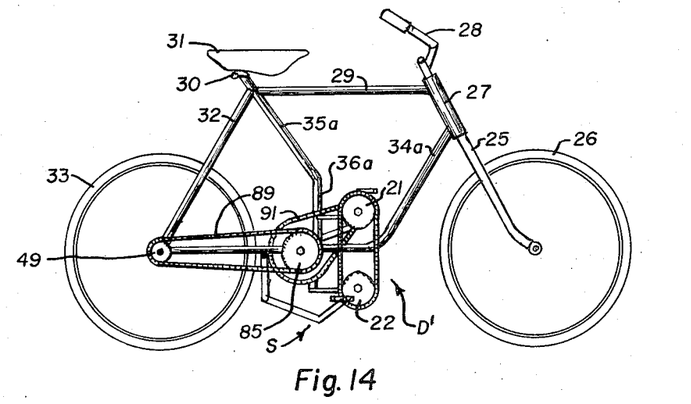
FIG. 14 is a side elevation similar to FIG. 1, but showing an alternative arrangement of the pedal drive upon the bicycle frame.
Figure 15:
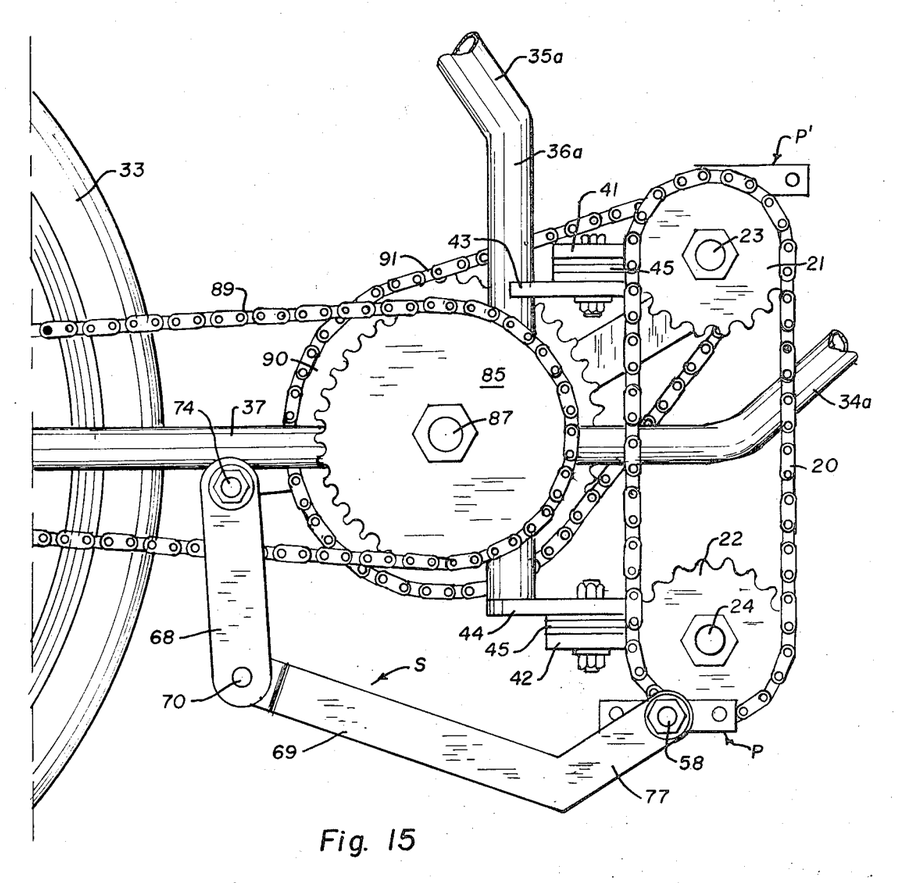
FIG. 15 is a fragmentary side elevation of a portion of FIG. 14, but on an enlarged scale to better show the pedal drive and other components.
Figure 16:
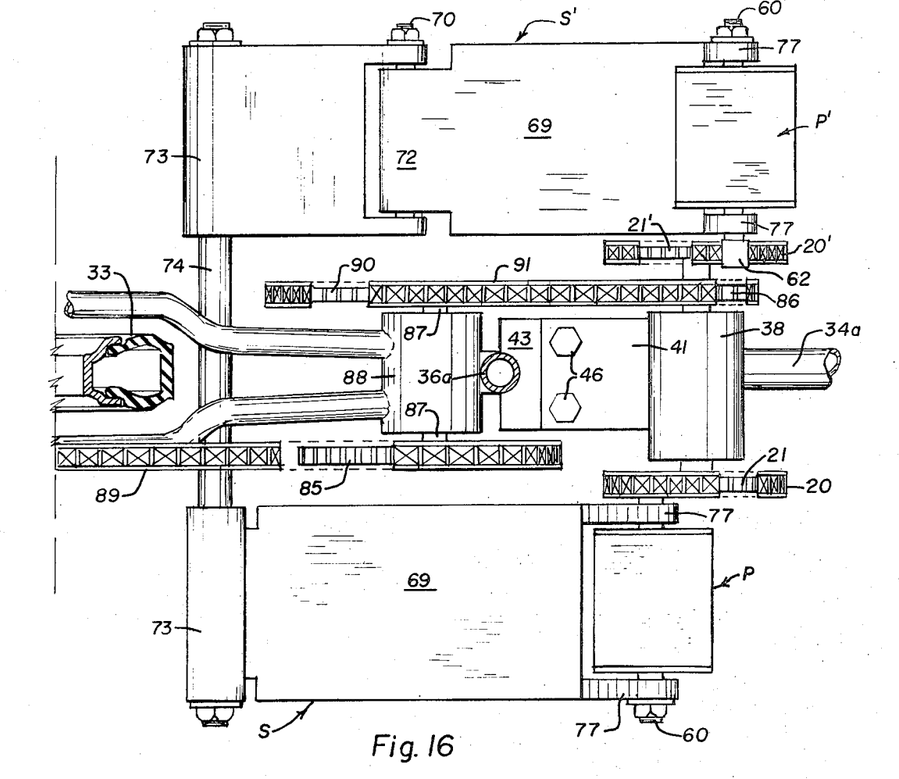
FIG. 16 is a top plan view of the organization shown in FIG. 15.

Each pedal P and P' is supported upon a cylindrical pedal shaft 58 and 58', respectively, which is cantilevered from its respective chain 20 and 20'. Each pedal shaft 58 and 58' extends through its respective pedal, with a portion projecting from each side of the pedal, to form a head 59 at the inner side of the shaft 58, and a threaded section 60 at the outer end of the shaft, to connect with forks extending from the stabilizer arms S and S', respectively, as hereinafter described. The head 59 is enlarged, compared with the diameter of the shaft 58, to hold the pedal at a centered position upon the shaft, with the shoulder at the head abutting against the inner bearing race 57, as best shown in FIG. 12. It is to be noted that the outward section 60 beyond the pedal has the same diameter as the main portion of the shaft 58, and that the assembly of components will be held in place by washer 83 and by a nut engaging the threaded end of the shaft.

The inner end of each pedal shaft 58 and 58' is affixed to the side of a U-shaped chain adaptor link 62 which is integral with head 59 and, in turn, is a part of chain 20 or 20'. The chain adaptor link 62 has two sets of connective holes in its legs to receive connector pins 63 of the links of the chain to become part of the chain, as clearly illustrated in FIG. 13. The legs of the chain adaptor link 62 are preferably thicker than the normal outside links 64 of the corresponding chain, while the chain is completed by inside links 65 and rollers 66 mounted on pins 63.

The organization above described is, in and of itself, complete; however the downward force exerted by the user against the cantilevered pedals P and P' will tend to create undue torsional deflections on the chain, especially when the pedals move between their respective upper and lower sprockets 21, 21', 22 and 22'. Thus, the stabilizer arms S and S', as described, or their equivalent, are provided to support the pedals.

Figures 9, 10:
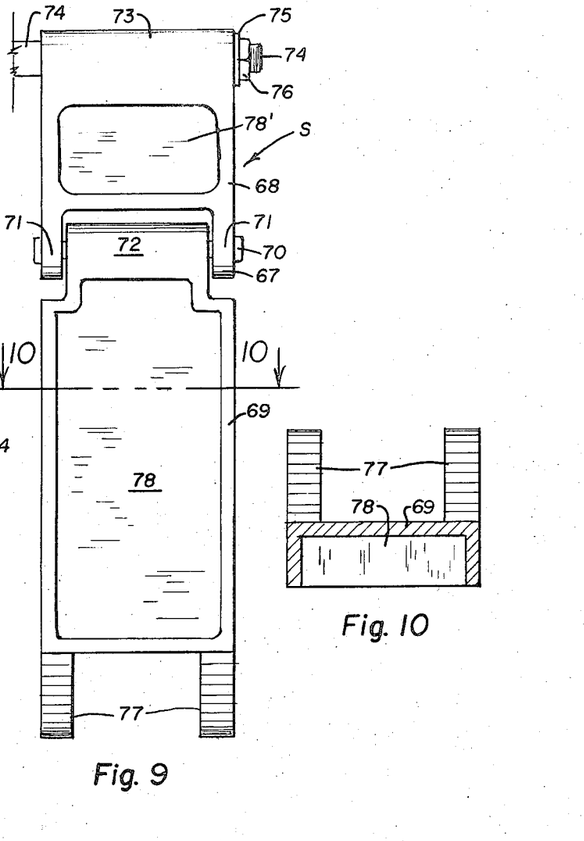
FIG. 9 is a bottom view of a pedal stabilizing arm per se, in a fully extended position.
FIG. 10 is a transverse sectional view taken along line 10—10 of FIG. 9.

Each stabilizer arm S and S' is a comparatively wide, two-piece member, having a short rear section 68 and a longer, forward section 69, as in FIG. 9. These sections are hinged together by a pivot bolt 70, the section 68 being formed with forks 71 at the front end and the section 69 having a tubular tongue 72 at the rear end which is embraced by the forks to receive the bolt 70. The rear end of the rear section is formed as a transverse, socketed head 73, which is fitted onto transverse pivot pin 74 which, in turn, is secured, as in FIG. 8, to the struts 37 of the bicycle frame, as by welding. The pivot pin, as shown, extends from both sides of the bicycle frame to hold both stabilizer arms S and S' in place, as by abutment of the inside of each head 73 against a shoulder on pin 74 and a washer 75 at the outside of each head 73 and nuts 76 at each end of the pivot pin, the pin being threaded for that purpose.

The front end of each forward section 69 includes a pair of upwardly inclined forks 77, as in FIGS. 2 and 9. Each of the forks 77 on the forward end of each stabilizer arm S and S' has a transverse hole through it to be fitted for rotation on the corresponding pedal shaft 58 or 58', with the respective pedal P or P' lying between forks 77, as in FIGS. 3 and 12. To provide greater resistance to stress without undue increase in weight, each section of the stabilizer arm is provided with a well 78 or 78', as in FIGS. 9 and 10, to provide a channel-shaped cross section.

As shown in FIG. 12, for the righthand pedal P and right stabilizer arm S, the hole through the inner fork 77 of section 69 engages a conventional ball bearing 80 mounted upon the head 59 of the pedal shaft 58, and the hole through the outer fork engages a conventional ball bearing 81 mounted upon the outer end of the pedal shaft. A spacer 82 is carried on pedal shaft 58 between the outboard bearing race 57 and the bearing 81, to hold the respective pedal P or P' in spaced alignment between the forks, allowing both the pedal and the stabilizer arm to freely and independently rotate on pedal shaft 58 but not to shift laterally along the shaft 58. A washer 83 at the outward face of the bearing 81 holds that race in position, when the nut 61 is tightened, which pushes the inward bearing race 57 solidly against the shoulder at head 59, with the forks 77 being integral with section 69 of the stabilizer arm causing inner bearing 80 to be held in position.

As shown in FIGS. 4 and 5, the stabilizer arms S and S' are freely extendable to follow the movement of the pedals about the chain paths, and to provide support for the pedals against lateral tipping at any pedal position. The inclined angle of forward forks 77 allows clearance for the heel of the cyclist's foot on each pedal during pedaling. It should be noted that the configurations of the stabilizer could be modified in minor detail without changing their basic function. However, each stabilizer arm must have sufficient lateral rigidity and resistance to longitudinal torsional stresses, to prevent the pedals from tipping. Thus, the stabilizer arms must be proportioned to be rigid and the channel-shaped cross section shown in FIG. 10 is one way in which the arms can be reduced in weight while maintaining adequate strength and rigidity.

Figure 17:
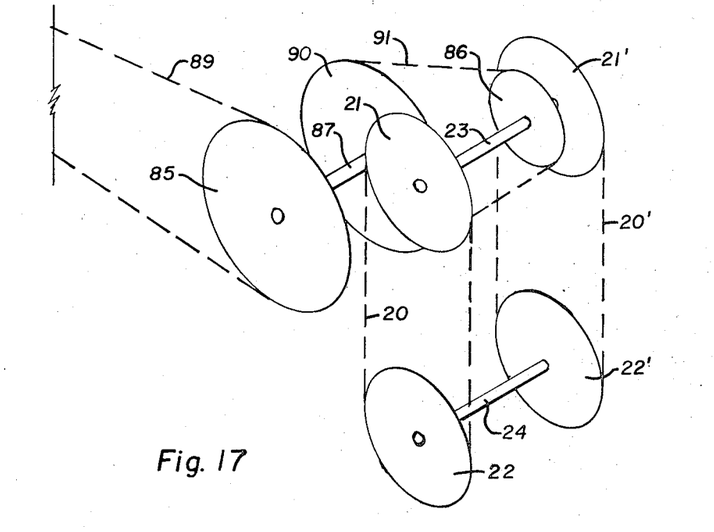
FIG. 17 is an isometric, schematic diagram of the chains and sprockets used in the alternative arrangement of the pedal drive shown in FIGS. 14–16.

The structure of the pedal drive D hereinbefore described is a preferred embodiment of this invention. However, it may be desirable to incorporate a conventional drive sprocket, drive shaft and drive shaft housing of a bicycle as part of the power transmission means for the improved pedal drive. Thus, the pedal drive D' illustrated in FIGS. 13-16 incorporates these conventional bicycle components into the organization. As heretofore described, the bicycle frame is modified in minor detail to move a conventional pedal sprocket 85 rearwardly. The front brace bar 34a and central brace member 35a are modified to allow for attachment of the pedal drive to a lower vertical section 36a of central frame member 35a. The drive components of the pedal drive D', as hereinbefore described, are unchanged and power is transmitted from the upper shaft 23, the same as heretofore described, as by a drive sprocket 86 which, however, is on the opposite side of the pedal drive from the sprocket 48 heretofore described, to be on the opposite side of the bicycle from that side where the driven sprocket 49 at the rear wheel is located, as best illustrated in FIG. 17.

The conventional pedal sprocket 85 is mounted upon a shaft 87 which extends through the conventional bearing housing 88 in the frame of the bicycle which, through shifted from the conventional position, is not changed. The shaft 87 is provided in lieu of the standard bicycle pedal shaft, and the shaft 87 is carried and secured in place in this housing 88 with conventional bearings and in a conventional manner, which need not b described. Each end of the shaft 87 extends a short distance from the bearing housing 88 to project from each side of the bicycle to carry a sprocket. One side, ordinarily the right side projection, carries the conventional pedal sprocket 85 which is connected to the driven sprocket 49 at the rear wheel of the bicycle by a chain 89.

The other, preferably left side projection of the shaft 87 carries a transmission sprocket 90 which lies in the plane of the drive sprocket 86 and is connected thereto by a chain 91. In this manner, the pedal drive is operatively engaged with the rear wheel of the bicycle, and it is to be noted that the drive sprocket 86 and transmission sprocket 90 are proportioned in such a manner as to provide any desirable ratio of movement between the pedals and the rear wheel of the bicycle. Also, with this modified arrangement, it is to be noted that a conventional speed shift type of bicycle may be used, such as a 10-speed model, where several sprockets are used instead of the single sprocket 85, as shown. It will also be noted that the diameters of sprockets 86, 90 and 85 may be chosen to provide a selected gearing ratio of the pedal drive D and are preferably of diameters of a size to provide a gearing ratio similar to that of a conventional bicycle.

The stabilizer arms S and S', which prevent tipping of the respective pedals P and P', may be essentially the same in construction as in the first embodiment, mounted in the same way on pivot pin 74, and connected to pedals P and P' in essentially the same way. Other parts of the alternative arrangement which correspond to parts of the first embodiment are identified by the same reference numerals. Thus, the construction and function of these parts has been described previously.

While the bicycle frames shown are those of a man's or boy's bicycle, it will be understood that the pedal drive of this invention may be similarly applied to a ladies' or girl's bicycle, as well as to bicycles having other types of frames.

I have now described my invention in considerable detail; however, it is obvious that other skilled in the art can build and devise alternate and equivalent constructions which are nonetheless within the spirit and scope of my invention.

What is claimed is:

1. A pedal drive for driving a bicycle or the like having a driven weheel or the like, comprising:
   a. a pair of rotatable, transverse shafts disposed in spaced parallelism and with one above the other;
   b. a pair of matched, laterally spaced sprockets on each shaft, with the corresponding sprockets of the two shafts aligned in a common plane normal to said shafts;
   c. an endless chain extending about each pair of corresponding sprockets, whereby each of the two chains move around identical oblong pedal paths extending around the respective sprockets and along the reach between the sprockets;
   d. pedal means secured to and outstanding from each chain, with the pedal at one side being in diametric opposition to the pedal at the other side;
   e. transmission means connecting with one of said shafts and to the aforesaid driven wheel or the like to drive the same responsive to pedalling of the pedal drive;
   f. stabilizing means for holding each pedal in a laterally outstanding position as it moves about the pedal path, each said stabilizing means being pivotally connected at one end to the corresponding pedal; and
   g. pivotal mounting means for the opposite end of each said stabilizing means, each said mounting means being spaced rearwardly from and disposed exteriorly of said pedal paths.

2. In the pedal drive defined in claim 1, wherein: said shafts are is essentially vertical alignment.

3. In the pedal drive defined in claim 1, wherein:
   a. said stabilizing means includes a laterally outstanding pivot pin spaced from the pedal disposed parallel to the said transverse shafts;
   b. each of said pedal means includes a pedal shaft paralleling said transverse shafts; and
   c. a hinged stabilizer arm at each side pivotally connected to said pivot pin and to each end of the corresponding pedal shaft, with the axes of the arm hinge, the pivot pin and pedal shaft being in spaced parallelism at all positions while the corresponding pedal shaft moves about the pedal path and the hinged arm articulates in response to such movement.

4. In the pedal drive defined in claim 1, wherein said chain is formed as an array of interconnected links fitted to said corresponding sprockets; and said pedal means includes a shaft having a unitary chain link at one end providing one of the array of links forming the chain.

5. In the pedal drive defined in claim 1, wherein:
said bicycle includes a frame, having a centrally disposed, depending member;
a bearing for each said sprocket shaft and disposed between the sprockets mounted thereon;
a mount for the upper sprocket shaft and attached to said depending frame member;
a mount for the lower sprocket shaft and attached to said depending frame member; and
each said mount is provided with means for changing the vertical position of the corresponding bearing.

6. A pedal drive for driving a bicycle or the like having a driven wheel or the like, comprising:
   a. a pair of rotatable, transverse shafts disposed in spaced parallelism and with one above the other;
   b. a pair of matched, laterally spaced sprockets on each shaft, with the corresponding sprockets of the two shafts aligned in a common plane normal to said shafts;
   c. an endless chain extending about each pair of corresponding sprockets, whereby each of the two chains move around identical oblong pedal paths extending around the respective sprockets and along the reach between the sprockets;
   d. pedal means secured to and outstanding from each chain, with the pedal at one side being in diametric opposition to the pedal at the other side;
   e. transmission means connecting with one of said shafts and to the aforesaid driven wheel or the like to drive the same responsive to pedalling of the pedal drive;
   f. stabilizing means for holding each pedal in a laterally outstanding position as it moves about the pedal path, each of said pedal means including a pedal shaft paralleling said transverse shafts and each said stabilizing means including a laterally outstanding pivot pin rearwardly of said pedal paths and disposed parallel to the transverse shafts; and
   g. a hinged stabilizer arm at each side pivotally connected to said pivot pin and to the corresponding pedal shaft, with the axes of the hinge of said arm, the pivot pin and pedal shaft being in spaced parallelism at all positions while the corresponding pedal shaft moves about the pedal path and the hinged arm articulates in response to such movement, the end of each stabilizer arm connecting with the respective pedal shaft being inclined upwardly so as to provide clearance for the operator's foot upon the pedal.

7. In the pedal drive defined in claim 6, wherein:
a pedal pad is carried upon each pedal shaft; and
each stabilizer arm includes a pair of spaced, upwardly inclined forks straddling the pedal pad and pivotally fitted upon the pedal shaft.

* * * * *

UNITED STATES PATENT OFFICE
CERTIFICATE OF CORRECTION

Patent No. 3,820,820   Dated June 28, 1974

Inventor(s) John E. Kutz

It is certified that error appears in the above-identified patent and that said Letters Patent are hereby corrected as shown below:

Column 2, line 44, "s'" should read --S'--. Column 6, line 29, "through" should read --though--; line 35, "b" should read --be--. Column 7, line 9, "other" should read --others--. Claim 1, column 7, line 15, "weheel" should read --wheel--. Claim 2, column 7, line 44, "is" should read --in--. Claim 3, column 7, line 47, cancel "spaced from the pedal".

Signed and sealed this 5th day of November 1974.

(SEAL)
Attest:

McCOY M. GIBSON JR.
Attesting Officer

C. MARSHALL DANN
Commissioner of Patents